United States Patent Office 2,833,660
Patented May 6, 1958

2,833,660
PLASTER

Vito G. Busatti, New York, N. Y.; Josephine Busatti, administratrix of said Vito G. Busatti, deceased No Drawing. Application December 31, 1952
Serial No. 329,120

6 Claims. (Cl. 106—114)

This invention relates to a plaster composition and is a continuation-in-part of my application Ser. No. 145,089, filed February 18, 1950, now abandoned.

In the ordinary application of plaster to produce a smooth wall or a ceiling, it is customary to apply several coats of different compositions, only the last of which is a white or finish plaster to give the desired smooth, white surface. This conventional process has serious practical limitations. For example, the base or brown coats of plaster applied in forming a wall or a ceiling must each be allowed to dry before the next coat is applied so that the final plaster wall will not quickly form cracks and checks. Not only does this procedure build up an unnecessarily thick section of plaster but it also means that the plasterer, whose time is valuable, must come at three different times and each time set up his equipment and go through the complete operation of preparing and applying a coat of plaster.

Another drawback to this conventional procedure is that the plaster must be applied quickly and worked into position within a short time. Various commercial retarders to slow down the setting of the plaster are available but have limited application and usually spoil the plaster mix if added in excess.

In many instances it has become so difficult and expensive to produce plaster ceilings that large building projects have formed the ceiling from molded concrete without any attempt to obtain a plaster ceiling.

It is an object of this invention to provide a plaster composition which overcomes these and other disadvantages and which can be applied in one or more coats to give a finished wall or ceiling surface with a superior finish.

Another object of the invention is to apply such a composition so that great savings can be effected in producing plastered walls and ceilings.

I have discovered that a plaster composition made with the usual amounts of lime and plaster of Paris can be greatly improved by including in the composition boric acid as a setting rate retarding agent and starch. The starch may be in the form of rice flour or the boiled juice or steepings obtained from rice flour although other forms of starch such as cornstarch may be used.

In most plaster compositions the lime and plaster of Paris are used in the proportions of about 5 bags of lime to 1 bag of plaster of Paris. I have found that these proportions are not at all critical when boric acid and starch are added in accordance with my invention. For example, the starch addition makes it possible to use less than 1 part plaster of Paris to 4 parts lime and still obtain a fiinished plaster that does not crack and is superior in many of its properties to a conventional mixture. Or, the proportion of plaster of Paris can be increased to an amount equal to or even in excess of the amount of lime in accordance with my invention provided proper amounts of boric acid and starch are also added to control the rate and characteristics of setting of the plaster. In ordinary plaster, of course, the amount of plaster of Paris that can be used is definitely limited. If more than 1 part for each 4 parts of lime is employed, the plaster is apt to set too quickly and the finished plaster may be brittle.

While not required, various other ingredients may also be included in the composition to improve or alter its properties or to adapt it for some particular application. For example, it may be advantageous under many conditions to use a substantial proportion of finely divided relatively inert materials such as white sand, marble dust, asbestos fibres, hair, wood fibres and the like. Other optional ingredients of the composition include small amounts of Keene's cement (hard calcined gypsum), alum and an adhesive that has some flexibility when hardened such as an adhesive made from pyroxylin or one or more of the cellulose or vinyl esters.

Even without any of these various optional constituents, I have found that my plaster composition is capable of being applied very advantageously as compared with ordinary plaster mix. Boric acid used as a retarder has particular merit because it can be used in an amount to slow down the setting rate of the plaster very substantially without producing serious cracks or checks in the hardened plaster. Also, if boric acid is added in excess of what is needed the plaster mix is not spoiled. The starch adds a considerable flexibility and toughness to the final coat enabling the application of much thinner coats than would normally be applied. It also has some retarding effect on the setting rate and makes unorthodox applications possible. For example, a wall prepared with wood or wire lath can be given a coat of ordinary plaster and then a finish coat of plaster of my invention can be applied without waiting more than about 15 minutes and without producing objectionable cracks.

Whether this plaster of my invention is applied to form a ceiling or a wall, the presence of the boric acid and starch, even though they may be present in small amounts, prevents the plaster from "peeling off" when it is applied with a trowel. The trowel slides easily and smoothly, does not leave a rough surface and the fresh plaster is much easier to join to an already hardened plaster section. Because of the greater elasticity, smoothness and easier workability of the plaster of this composition, it can be applied in a very thin coat and thus a given quantity of the composition can be used to coat a much larger than normal surface.

This composition can also be applied, unlike ordinary plaster, directly to a surface of concrete, stone or the like, although when applied to such a surface it is usually best to include in the composition additional ingredients such as marble dust and Keene's cement or some other adhesive to give the plaster greater adhesion to the surface.

In addition to the application of my improved plaster compound in the usual manner, it may also be applied in making walls or ceilings by a molding operation. For example, in forming a ceiling, the mold used, which usually is constructed of wood, may be first coated with a plaster mix compounded in accordance with my invention which is troweled in place and then the cement poured on top of the plaster. This can be done to give a finish plastered surface in one operation and the plaster composition is easily applied to the form even though some of its surface may be vertical.

Poured walls may also be easily prepared using wire lath or other porous form members to hold a brown or concrete mixture in place and a white plaster finish can be obtained by pouring the plaster composition of my invention between the surface of an outer form and such porous wall lath form.

The following compositions are given by way of example but the invention is not intended to be limited thereto since it will be apparent to those skilled in the art that some variations in the proportions of the ingredients or by way of adding additional ingredients can be made within the scope of my invention.

*Example I.*—The plaster composition is made up with approximately the following proportions:

| | Parts by weight |
|---|---|
| Lime | 1000 |
| Plaster of Paris | 150 |
| White sand | 200 |
| Boric acid | 1 |
| Rice flour | 5 |

The foregoing composition contains substantially less plaster of Paris than is customary and includes white sand which is very desirable but not essential. The amount of boric acid can be varied considerably depending upon the amount of the retarding effect that is desired. In the proportion given, the composition can be readily worked for about 3 to 4 hours compared with the usual plaster composition which has to be fully applied in about ¾ of an hour. The quantity of rice powder can be varied substantially and can either be added to the composition in the form of a powder or flour, or it can be boiled and the steepings or juice added to the plaster composition.

*Example II.*—Another plaster using less than the normal amount of plaster of Paris is as follows:

| | Parts by weight |
|---|---|
| Lime | 1000 |
| Plaster of Paris | 150 |
| Boric acid | 1 |
| Rice powder and cornstarch | 7 |

*Optional ingredients*

| | Parts by weight |
|---|---|
| Keene's cement | 50 |
| Marble dust | 30 |
| Alum | 1¼ |

*Example III.*—A plaster using considerably more than the conventional amount of plaster of Paris can be formulated as follows:

| | Parts by weight |
|---|---|
| Lime | 800 |
| Plaster of Paris | 600 |
| Boric acid | 4 |
| Rice flour or cornstarch | 32 |

Based on 1000 parts of lime, I may use plaster of Paris in an amount that is considerably more or less than the conventional 25% (of the weight of lime). In fact, the amount of plaster of Paris may vary all the way from 5% to even 200% of the weight of the lime. In general an amount that is 25–50% of the lime is very satisfactory. The amount of boric acid used will vary depending upon the proportion of plaster of Paris, the setting rate desired, and to a lesser extent the amount of starch. In general the amount of boric acid used will fall within the range of 0.1% to 3 or 4% of the weight of the plaster of Paris. If plaster of Paris is used in larger than normal amounts, the amount of boric acid should be increased to keep the plaster from setting too quickly. Increasing the boric acid in any given formula slows down the setting rate. An excess of boric acid may delay too much the hardening of the plaster but will not otherwise be objectionable.

The starch gives the plaster elasticity and toughness, and also has an effect on the setting rate. When as much as 10% rice powder is used (based on the weight of lime) the boric acid may be omitted entirely and the composition will still require an unusually long time to harden. With such a large proportion of starch, however, the final product will still not crack but will be somewhat softer than usual. For most purposes, it is desirable to use at least about 3 parts of rice powder with each 1000 parts of lime.

If the composition of my invention is to be applied directly to a rough surface, such as concrete or stone, or if it is to be applied in the formation of a ceiling, it may be desirable to add to it a small amount such as ¼% (based on the weight of lime) of a flexible adhesive such as one of the pyroxylin or cellulose ester adhesives readily available on the market. This gives the plaster much greater adhesion when applied to such surfaces.

Plaster compositions of my invention may be made up, of course, by mixing the various ingredients together at the site where the plaster is to be used. Such compositions may also be mixed dry and in this form include, except for water, all or most of the ingredients needed in the final plaster mix.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A wall plaster composition suitable when mixed with water for application to a surface with a trowel in a single coat and also for application in more than one coat without waiting for the underneath coat to dry, said composition consisting essentially of lime and plaster of Paris as its principal constituents, the plaster of Paris being present in an amount from 5 to 100% of the weight of the lime, boric acid as a setting rate retarder in an amount of from 0.1 to 4% of the weight of the plaster of Paris, and starch in an amount of from 0.3 to 10% of the weight of the lime, said composition being characterized by ease of application when applied with a trowel and great resiliency, toughness and strong adherence to surfaces on which it is applied after setting.

2. A composition as defined in claim 1 in which the starch is rice powder.

3. A composition as defined in claim 1 in which the starch is cornstarch.

4. A plaster composition which consists of the following as its principal active ingredients in approximately the following proportions:

| | Parts |
|---|---|
| Lime | 1000 |
| Plaster of Paris | 150 |
| Boric acid | 1 |
| Rice flour | 5 |

5. A plaster composition which consists of the following as its principal active ingredients in approximately the following proportions:

| | Parts |
|---|---|
| Lime | 1000 |
| Plaster of Paris | 150 |
| White sand | 200 |
| Boric acid | 1 |
| Rice flour | 5 |

6. A wall plaster composition consisting essentially of plaster of Paris and lime and containing more plaster of Paris than the usual proportion of 1 part plaster of Paris to 4 parts lime, said composition also containing starch in the amount of 0.3 to 10% of the weight of the lime and boric acid in an amount of 0.1 to 4% of the weight of the plaster of Paris, and said composition when mixed with water being capable of easy application with a trowel and after setting being characterized by its exceptional resiliency, toughness and adherence to the surface on which it is applied.

References Cited in the file of this patent

UNITED STATES PATENTS

| 387,519 | Key | Aug. 7, 1888 |
| 482,544 | Casselman | Sept. 13, 1892 |

| | | |
|---|---|---|
| 558,434 | Summers | Apr. 14, 1896 |
| 558,435 | Summers | Apr. 14, 1896 |
| 1,607,325 | Walper | Nov. 16, 1926 |
| 1,732,737 | Wiggin et al. | Oct. 22, 1929 |
| 2,269,457 | Jurgensen | Jan. 13, 1942 |
| 2,374,628 | Swayze | Apr. 24, 1945 |
| 2,388,543 | Hoggatt | Nov. 6, 1945 |
| 2,557,083 | Eberl | June 19, 1951 |

FOREIGN PATENTS

| | | |
|---|---|---|
| 10,130 | Great Britain | Dec. 17, 1914 |

OTHER REFERENCES

Welch, F. C., Journal of the American Ceramic Society, vol. 6 (1923), page 1204.